US012592158B2

(12) United States Patent (10) Patent No.: US 12,592,158 B2
Sarr et al. (45) Date of Patent: Mar. 31, 2026

(54) SYSTEM FOR USING A SPACE INTEGRATION SEQUENCER SYSTEM

(71) Applicants: Thierry D. Sarr, Inglewood, CA (US); Kevin Kelley, Los Angeles, CA (US)

(72) Inventors: Thierry D. Sarr, Inglewood, CA (US); Kevin Kelley, Los Angeles, CA (US)

( * ) Notice: Subject to any disclaimer, the term of this patent is extended or adjusted under 35 U.S.C. 154(b) by 0 days.

(21) Appl. No.: 19/049,926

(22) Filed: Feb. 10, 2025

(65) Prior Publication Data

US 2025/0259558 A1 Aug. 14, 2025

Related U.S. Application Data

(60) Provisional application No. 63/552,263, filed on Feb. 12, 2024.

(51) Int. Cl.
G08G 5/90 (2025.01)
G08G 5/26 (2025.01)
H04N 23/695 (2023.01)

(52) U.S. Cl.
CPC ................. G08G 5/90 (2025.01); G08G 5/26 (2025.01); H04N 23/695 (2023.01)

(58) Field of Classification Search
CPC ........... G08G 5/90; G08G 5/26; H04N 23/695
See application file for complete search history.

(56) References Cited

U.S. PATENT DOCUMENTS 7,710,452 B1 * 5/2010 Lindberg ............... H04N 7/188
348/149
8,082,102 B2 * 12/2011 Ravenscroft ............. G08G 5/55
701/2

(Continued)

FOREIGN PATENT DOCUMENTS

CN 108351645 A * 7/2018 ............. G08G 5/727
CN 112991729 A * 6/2021 ........... G08G 1/0125
WO WO-2021196529 A1 * 10/2021 ............ B25J 19/061

OTHER PUBLICATIONS

"IEEE Standard for a Framework for Structuring Low-Altitude Airspace for Unmanned Aerial Vehicle (UAV) Operations;" IEEE Std 1939.1-2021 (2021, pp. 1-94); Dec. 1, 2021. (Year: 2021).*

(Continued)

*Primary Examiner* — Khoi H Tran
*Assistant Examiner* — Jorge O Peche
(74) *Attorney, Agent, or Firm* — Boudwin Intellectual Property Law, LLC; Daniel Boudwin

(57) ABSTRACT

A system for using a space integration sequencer system that coordinates timing of aircraft operations including arrivals, departures, and enroute flights with current and future aircraft operations. The system includes an overall system input, an overall system logic, and an overall system output. The overall system input includes a plurality of vehicle telemetry and a plurality of regulatory data. The overall system logic includes a pathway identifier, a first pathway intersection, an algorithm, and a second pathway intersection. The overall system output includes a pathway generator and a pathway reroute. The overall system includes a camera-based sensor system includes a Pan-Tilt-Zoom camera, an edge computer, a backup battery, and an optional solar power source and a Light Detection and Ranging system that includes a plurality of lasers, a scanner, a Global Positioning System, and an Inertial Measurement Unit.

11 Claims, 9 Drawing Sheets

(56) References Cited

U.S. PATENT DOCUMENTS

| | | | | |
|---|---|---|---|---|
| 8,515,609 B2* | 8/2013 | McAndrew | G05D 1/0088 | |
| | | | 244/76 R | |
| 8,736,818 B2* | 5/2014 | Weimer | G01S 17/89 | |
| | | | 250/208.2 | |
| 8,775,062 B2 | 7/2014 | Becher et al. | | |
| 9,056,676 B1* | 6/2015 | Wang | B60R 9/00 | |
| 9,359,074 B2* | 6/2016 | Ganesh | G06Q 10/083 | |
| 9,437,114 B2* | 9/2016 | Ince | G08G 5/55 | |
| 9,448,562 B1* | 9/2016 | Sirang | G05D 1/0676 | |
| 9,671,791 B1* | 6/2017 | Paczan | G08G 5/57 | |
| 9,767,699 B1* | 9/2017 | Borghese | G08G 5/54 | |
| 9,805,273 B1* | 10/2017 | Seeber | G06V 20/52 | |
| 9,805,372 B2* | 10/2017 | Gong | G06F 16/29 | |
| 9,847,033 B1* | 12/2017 | Carmack | G06Q 10/08355 | |
| 9,849,978 B1* | 12/2017 | Carmack | G08G 5/25 | |
| 9,864,372 B2* | 1/2018 | Chen | H04L 65/613 | |
| 9,997,080 B1* | 6/2018 | Chambers | G08G 5/59 | |
| 10,059,444 B2 | 8/2018 | Stefani | | |
| 10,096,038 B2* | 10/2018 | Ramirez | G01C 21/3461 | |
| 10,118,692 B1* | 11/2018 | Beckman | G06Q 10/0832 | |
| 10,429,839 B2* | 10/2019 | Liu | G05D 1/102 | |
| 10,439,550 B1* | 10/2019 | Goodman | F24S 50/20 | |
| 10,466,700 B1* | 11/2019 | Carmack | G05D 1/101 | |
| 11,163,962 B2* | 11/2021 | Brake | G06F 40/242 | |
| 11,345,469 B2* | 5/2022 | McDonald | B64U 30/20 | |
| 11,450,096 B2* | 9/2022 | Tan | G06N 3/0495 | |
| 11,585,886 B1* | 2/2023 | Meyer | H04B 1/0003 | |
| 11,866,167 B2* | 1/2024 | Youmans | G06V 20/176 | |
| 12,333,277 B2* | 6/2025 | Johnson | G06N 3/0464 | |
| 12,451,020 B2* | 10/2025 | Chen | G08G 5/55 | |
| 2003/0075642 A1* | 4/2003 | Silansky | H04B 7/18595 | |
| | | | 244/30 | |
| 2013/0110388 A1* | 5/2013 | Becher | G08G 5/54 | |
| | | | 701/120 | |
| 2014/0316616 A1* | 10/2014 | Kugelmass | G08G 5/26 | |
| | | | 701/8 | |
| 2015/0133073 A1* | 5/2015 | Mitchell | H04W 4/08 | |
| | | | 455/404.1 | |
| 2015/0323930 A1* | 11/2015 | Downey | G08G 5/22 | |
| | | | 701/14 | |
| 2016/0068264 A1* | 3/2016 | Ganesh | G08G 5/55 | |
| | | | 701/4 | |
| 2016/0091894 A1* | 3/2016 | Zhang | B64U 10/13 | |
| | | | 701/2 | |
| 2016/0257424 A1* | 9/2016 | Stabler | A63H 27/12 | |
| 2016/0266579 A1* | 9/2016 | Chen | G05D 1/0044 | |
| 2016/0275801 A1* | 9/2016 | Kopardekar | G08G 5/55 | |
| 2016/0378121 A1* | 12/2016 | Shue | G08G 5/26 | |
| | | | 701/7 | |
| 2017/0083979 A1* | 3/2017 | Winn | G06Q 20/102 | |
| 2017/0092138 A1* | 3/2017 | Trundle | H04K 3/82 | |
| 2017/0200378 A1* | 7/2017 | Smothers | G01N 30/12 | |
| 2017/0217571 A1* | 8/2017 | Deng | B64U 30/293 | |
| 2017/0255198 A1* | 9/2017 | Rodriguez | G05D 1/0274 | |
| 2017/0286887 A1* | 10/2017 | Moran | G08G 5/55 | |
| 2017/0327224 A1* | 11/2017 | Phan | B64U 50/19 | |
| 2017/0330466 A1* | 11/2017 | Demetriades | G08G 5/57 | |

| | | | | |
|---|---|---|---|---|
| 2017/0337219 A1* | 11/2017 | Ubhi | G08G 5/727 | |
| 2017/0358212 A1* | 12/2017 | Godwin | H04K 3/90 | |
| 2018/0026708 A1* | 1/2018 | Priest | G08G 5/57 | |
| | | | 370/316 | |
| 2018/0095460 A1* | 4/2018 | Chen | G06V 20/52 | |
| 2018/0109399 A1* | 4/2018 | Cardoso de Moura | | |
| | | | H04W 88/06 | |
| 2018/0118340 A1* | 5/2018 | Russo | B64U 50/37 | |
| 2018/0129881 A1* | 5/2018 | Seeber | G08G 5/22 | |
| 2018/0293898 A1* | 10/2018 | Redmann | B64U 10/14 | |
| 2018/0357909 A1* | 12/2018 | Eyhorn | G08G 5/34 | |
| 2019/0023392 A1* | 1/2019 | Micros | B64U 80/82 | |
| 2019/0265705 A1* | 8/2019 | Zhang | G05D 1/644 | |
| 2019/0369641 A1* | 12/2019 | Gillett | G05D 1/0088 | |
| 2020/0013301 A1* | 1/2020 | Vana | B64C 25/405 | |
| 2020/0050200 A1* | 2/2020 | Torii | G05D 1/0088 | |
| 2020/0135036 A1* | 4/2020 | Campbell | G06T 11/206 | |
| 2020/0156778 A1* | 5/2020 | McDonald | B64D 9/00 | |
| 2020/0349852 A1* | 11/2020 | DiCosola | G08G 5/55 | |
| 2021/0011976 A1* | 1/2021 | Brake | G06F 40/242 | |
| 2021/0304625 A1* | 9/2021 | Ali | G08G 5/22 | |
| 2021/0312818 A1* | 10/2021 | Kadavil | G08G 5/32 | |
| 2021/0319394 A1* | 10/2021 | Tazume | G06Q 10/08 | |
| 2021/0383223 A1* | 12/2021 | Tan | G06N 3/08 | |
| 2022/0014675 A1* | 1/2022 | Henry | H04N 5/2628 | |
| 2022/0092406 A1* | 3/2022 | Amad | G06N 3/08 | |
| 2022/0157176 A1 | 5/2022 | Sidiropoulos | | |
| 2022/0262262 A1* | 8/2022 | Driscoll | G08G 5/55 | |
| 2022/0390940 A1* | 12/2022 | Richman | G05D 1/0016 | |
| 2022/0396373 A1* | 12/2022 | Wang | E05F 15/00 | |
| 2023/0142394 A1* | 5/2023 | Henry | G05D 1/229 | |
| | | | 382/103 | |
| 2023/0259759 A1* | 8/2023 | Tan | G06N 3/08 | |
| | | | 706/25 | |
| 2023/0343226 A1* | 10/2023 | Bieringer | G08G 5/20 | |
| 2024/0119850 A1* | 4/2024 | Choi | G08G 5/22 | |
| 2024/0133693 A1* | 4/2024 | Ali | G08G 5/55 | |
| 2024/0278946 A1* | 8/2024 | Roberts | B64U 70/92 | |
| 2024/0371186 A1* | 11/2024 | Alonazi | G01S 17/86 | |
| 2025/0026503 A1* | 1/2025 | Miller | B64U 10/14 | |
| 2025/0046199 A1* | 2/2025 | Chen | G08G 5/26 | |
| 2025/0078667 A1* | 3/2025 | Dobbins | G08G 5/59 | |
| 2025/0131836 A1* | 4/2025 | Gu | G08G 5/51 | |
| 2025/0139369 A1* | 5/2025 | Zhou | G06N 3/08 | |
| 2025/0216857 A1* | 7/2025 | Fliszar | G06V 20/17 | |
| 2025/0253009 A1* | 8/2025 | Lee | G16B 45/00 | |
| 2025/0259558 A1* | 8/2025 | Sarr | G08G 5/727 | |
| 2025/0296713 A1* | 9/2025 | Hintermann | G06V 40/107 | |

OTHER PUBLICATIONS

"Comprehensive Review of Drones Collision Avoidance Schemes: Challenges and Open Issues;" Rezaee et al., IEEE Transactions on Intelligent Transportation Systems (vol. 25, Issue: 7, 2024, pp. 6397-6426); Mar. 21, 2024. (Year: 2024).*

"Autonomous Advanced Aerial Mobility—An End-to-End Autonomy Framework for UAVs and Beyond;" Mishra et al., IEEE Access (vol. 11, 2023, pp. 136318-136349); Jan. 1, 2023 (Year: 2023).*

* cited by examiner

100

SPACE
INTEGRATION
SEQUENCER
SYSTEM
300

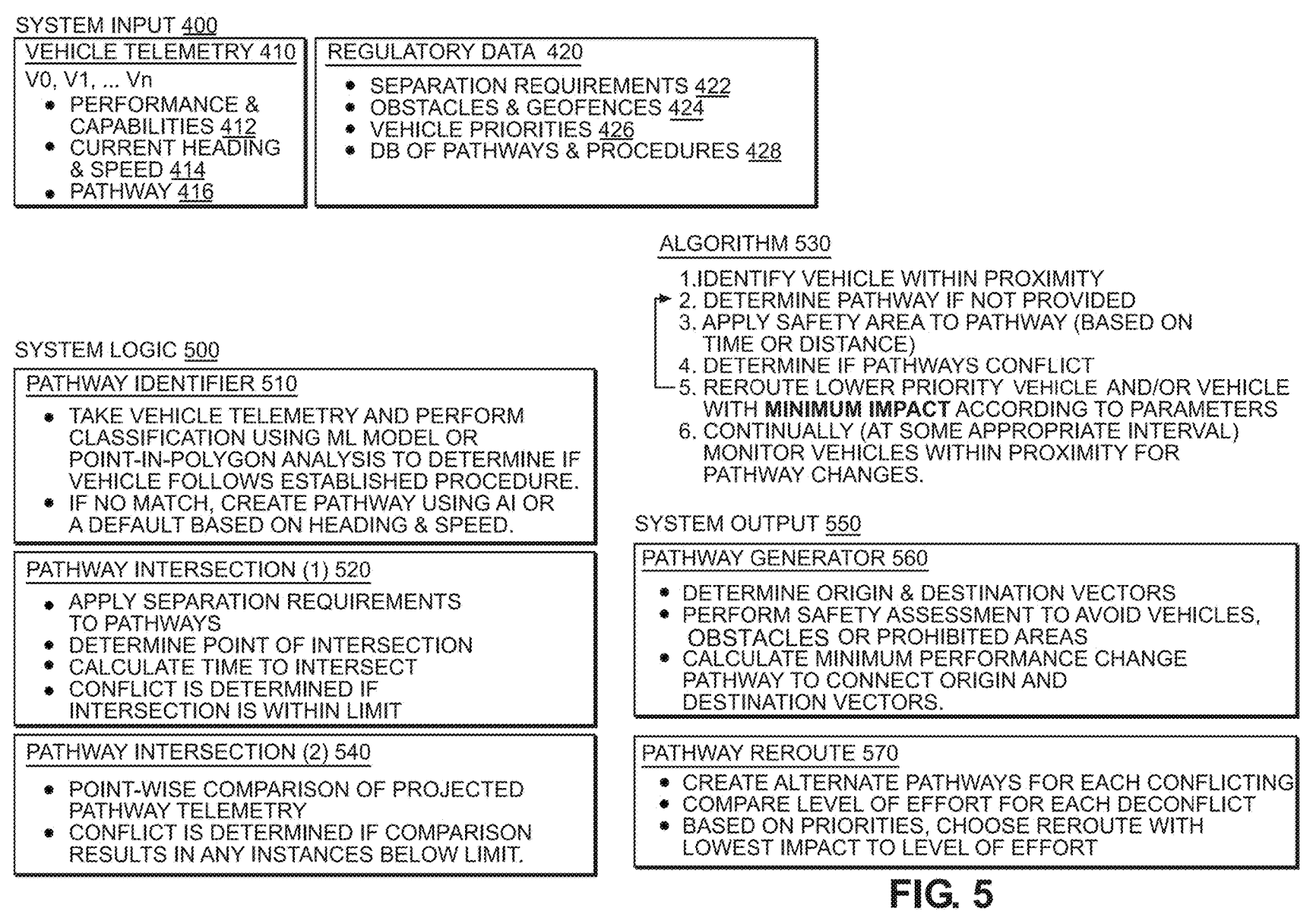

SYSTEM INPUT 400

VEHICLE TELEMETRY 410

V0, V1, ... Vn
- PERFORMANCE & CAPABILITIES 412
- CURRENT HEADING & SPEED 414
- PATHWAY 416

REGULATORY DATA 420
- SEPARATION REQUIREMENTS 422
- OBSTACLES & GEOFENCES 424
- VEHICLE PRIORITIES 426
- DB OF PATHWAYS & PROCEDURES 428

ALGORITHM 530
1. IDENTIFY VEHICLE WITHIN PROXIMITY
2. DETERMINE PATHWAY IF NOT PROVIDED
3. APPLY SAFETY AREA TO PATHWAY (BASED ON TIME OR DISTANCE)
4. DETERMINE IF PATHWAYS CONFLICT
5. REROUTE LOWER PRIORITY VEHICLE AND/OR VEHICLE WITH MINIMUM IMPACT ACCORDING TO PARAMETERS
6. CONTINUALLY (AT SOME APPROPRIATE INTERVAL) MONITOR VEHICLES WITHIN PROXIMITY FOR PATHWAY CHANGES.

SYSTEM OUTPUT 550

PATHWAY GENERATOR 560
- DETERMINE ORIGIN & DESTINATION VECTORS
- PERFORM SAFETY ASSESSMENT TO AVOID VEHICLES, OBSTACLES OR PROHIBITED AREAS
- CALCULATE MINIMUM PERFORMANCE CHANGE PATHWAY TO CONNECT ORIGIN AND DESTINATION VECTORS.

PATHWAY REROUTE 570
- CREATE ALTERNATE PATHWAYS FOR EACH CONFLICTING
- COMPARE LEVEL OF EFFORT FOR EACH DECONFLICT
- BASED ON PRIORITIES, CHOOSE REROUTE WITH LOWEST IMPACT TO LEVEL OF EFFORT

SYSTEM LOGIC 500

PATHWAY IDENTIFIER 510
- TAKE VEHICLE TELEMETRY AND PERFORM CLASSIFICATION USING ML MODEL OR POINT-IN-POLYGON ANALYSIS TO DETERMINE IF VEHICLE FOLLOWS ESTABLISHED PROCEDURE. IF NO MATCH, CREATE PATHWAY USING AI OR A DEFAULT BASED ON HEADING & SPEED.

PATHWAY INTERSECTION (1) 520
- APPLY SEPARATION REQUIREMENTS TO PATHWAYS
- DETERMINE POINT OF INTERSECTION
- CALCULATE TIME TO INTERSECT
- CONFLICT IS DETERMINED IF INTERSECTION IS WITHIN LIMIT

PATHWAY INTERSECTION (2) 540
- POINT-WISE COMPARISON OF PROJECTED PATHWAY TELEMETRY
- CONFLICT IS DETERMINED IF COMPARISON RESULTS IN ANY INSTANCES BELOW LIMIT.

FIG. 5

SYSTEM FOR USING A SPACE INTEGRATION SEQUENCER SYSTEM

CROSS-REFERENCE TO RELATED APPLICATIONS

This U.S. Non-Provisional Patent Application claims the benefit of U.S. Provisional Patent Application No. 63/552,263 filed on Feb. 12, 2024. The above identified patent application is herein incorporated by reference in its entirety to provide continuity of disclosure.

BACKGROUND OF THE INVENTION

The present invention relates to a system for using a space integration sequencer system.

Air traffic controllers have some of the most stressful and demanding jobs in the world that involve long hours and intense concentration. They frequently must coordinate operations including arrivals, departures, and enroute flights of all types of aircraft such as emerging Advanced Air Mobility or (AAM) aircraft and Urban Air Mobility or (UAM) aircraft as well as current aircraft and legacy aircraft. The current process requires controllers to actively monitor aircraft operations and provide instructions to maintain safe separation.

What is needed is a system for using a space integration sequencer system that coordinates timing of aircraft operations including arrivals, departures, and enroute flights with current and future aircraft operations based on aircraft performance characteristics and navigation and communications with on-board and external technology.

SUMMARY OF THE INVENTION

In view of the foregoing disadvantages inherent in the known types of systems for using a space integration sequencer system now present in the prior art, the present invention provides a system for using a space integration sequencer system, wherein the same may coordinate timing of aircraft operations with current and future vehicle operations such as aircraft and spacecraft operations or anywhere within navigable space.

The present system is a system for a space integration sequencer system comprising a server system with a processor system, a communications interface, a communications system, an input system and an output system, the server system having access to a communications network, a memory system with an operating system, a communications module, a web browser module, a web server application and a space integration sequencer system non-transitory storage media. The memory system is in communication with the server system through the communications network, and a space integration sequencer system in communication with the server system.

An object of the present invention is to provide a system for using a space integration sequencer system that enables two kinds of operations that would otherwise be handled separately and without the ability to dynamically and accurately sequence the operations based on live performance characteristics and continuous and live information exchange between aircraft, navigational aids, and an air traffic control system, thereby increasing situational awareness, enhancing safety, and minimizing air traffic controllers' workload.

An object of the present invention is to provide a system for using a space integration sequencer system that handles aircraft arrivals into an airport, and a plurality of UAM aircraft arrivals into the same airport, to be handled together and automatically with enhanced safety.

An object of the present invention is to provide a system for using a space integration sequencer system that eliminates the need for vehicles to hold short of an intersection and wait for clearance.

Another object of the present invention is to provide a system for using a space integration sequencer system that eliminates the need for air traffic controllers to give clearance to UAMs on approach to an airport, except in cases of emergency or equipment failure and eliminates the need for vehicles to hold short of an intersection and wait for clearance.

Another object of the present invention is to provide a system for using a space integration sequencer system that is meant to solve space integration within multiple operating environments (space, air, land, sea, and submarine) and a combination thereof.

Another object of the present invention is to provide a system for using a space integration sequencer system that will allow air, land, and sea vehicles traffic to be coordinated simultaneously using an integrated autonomous system.

Another object of the present invention is to provide a system for using a space integration sequencer system that proposes an advanced Artificial Intelligence (or AI) computer vision system to monitor runway operations by identifying, tracking, and classifying aircraft movements in real-time.

Another object of the present invention is to provide a system for using a space integration sequencer system that integrates AI algorithms with a plurality of Pan-Tilt-Zoom or (PTZ) camera systems and edge computing to create an automated solution for airport operations.

Another object of the present invention is to provide a system for using a space integration sequencer system that leverages existing technologies to solve a critical problem faced by airports globally, accurately and efficiently tracking aircraft movements to optimize revenue collection and enhance operational awareness.

Another object of the present invention is to provide a system for using a space integration sequencer system that utilizes AI algorithms combined with a plurality of PTZ camera systems to accurately detect, track, and classify aircraft movements in various airport environments, overcoming challenges posed by dynamically changing backgrounds, lighting conditions, and large field-of-view requirements.

Another object of the present invention is to provide a system for using a space integration sequencer system that integrates edge computing with camera systems to enable real-time processing and decision-making, making it feasible to deploy a standalone, automated aircraft tracking system with minimal latency and data transmission needs.

Another object of the present invention is to provide a system for using a space integration sequencer system that includes an AI algorithm designed to detect objects against a moving background, essential for tracking aircraft as the aircraft traverse runways.

Another object of the present invention is to provide a system for using a space integration sequencer system that translates object positions within a camera's field of view into alignment inputs for real-time tracking, even during temporary losses in detection.

Another object of the present invention is to provide a system for using a space integration sequencer system that identifies different types of aircraft activities (e.g., arrivals, departures, touch-and-go operations) based on observed movement patterns.

Another object of the present invention is to provide a system for using a space integration sequencer system that captures images of aircraft markings, such as tail liveries and registration numbers, to provide verifiable records of operations.

Another object of the present invention is to provide a system for using a space integration sequencer system that includes a standalone, edge-computing-enabled hardware system powered by solar energy and mobile data, ensuring remote operability with minimal infrastructure requirements.

Another object of the present invention is to provide a system for using a space integration sequencer system that includes an AI, system-wide self-monitoring function that reports the accuracy and completeness of input and output data to ensure the integrity of directions provided to users.

Another object of the present invention is to provide a system for using a space integration sequencer system that includes AI devices such as headsets, smart/electronic display eyeglasses, holographic devices, or other means of conveying information.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 5 shows one embodiment of an overall system input, a system logic, and a system output of the system for using a space integration sequencer system.

DETAILED DESCRIPTION OF THE INVENTION

Figure 1:
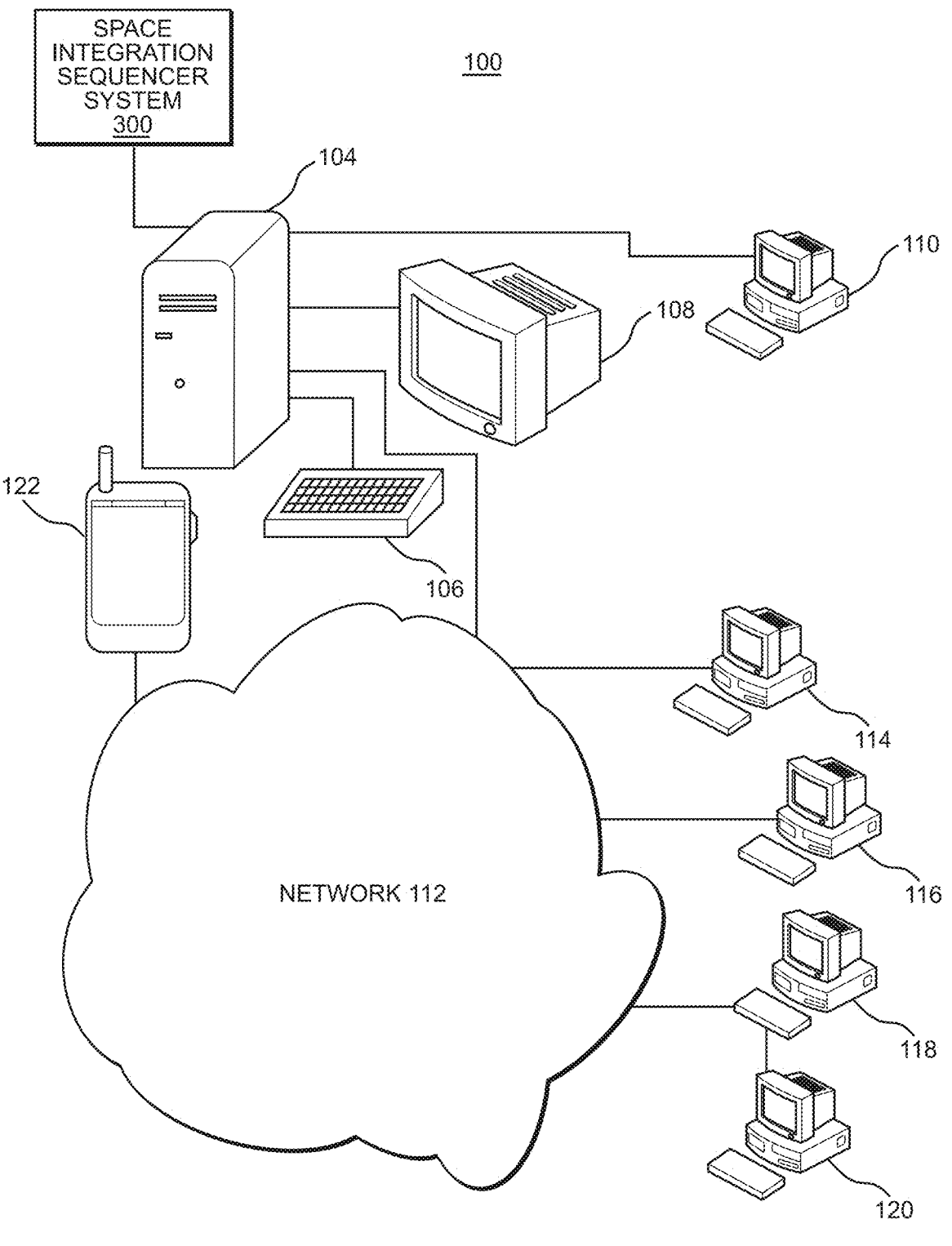
FIG. 1 shows a system overview of a system for using a space integration sequencer system.

Reference is made herein to the attached drawings. Like reference numerals are used throughout the drawings to depict like or similar elements of the space integration sequencer. The figures are intended for representative purposes only and should not be considered to be limiting in any respect. The terms craft, aircraft, vehicle, and EVTOL are used interchangeably throughout to all equate to an object capable of taking up a designated space in time or area, or moving between two points including those vehicles that can traverse land, water, air and/or space or any other conceivable medium. For example, references throughout to aircraft are equally equated to be interchangeable with a vehicle that moves on land with wheels or any other object that may require deconflicting, in terms of designating and utilizing position, paths, etc. as is the intent of the present system. Likewise, references to power sources or electric and/or petroleum may designate a craft capable of producing power from any known or conceivable energy or to power any known or conceivable power system.

FIG. 1 shows a system overview of a system for using a space integration sequencer system (thereby known as the overall system) 100.

The overall system 100 includes a server system 104, an input system 106, an output system 108, a plurality of client systems 110, 114, 116, 118 and 120, a communications network 112, a hand-held device 122, and a space integration sequencer system 300. In other embodiments, the overall system 100 may include additional components and/or may not include all of the components listed above.

The server system 104 may include one or more servers. One server may be the property of the distributor of any related software or non-transitory storage media. In other embodiments, the overall system 100 may include additional components and/or may not include all of the components listed above.

The input system 106 may be used for entering input into the server system 104, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (i.e., Infrared Data Association or IrDA, Universal Serial Bus or USB), for example.

The output system 108 may be used for receiving output from the server system 104, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The overall system 100 may illustrate some of the variations of the manners of connecting to the server system 104, which may be an information providing website (not shown). The server system 104 may be directly connected and/or wirelessly connected to the plurality of client systems 110, 114, 116, 118 and 120 and are connected via the communications network 112. Client system 120 may be connected to the server system 104 via the client system 118. The communications network 112 may be any one of, or any combination of, one or more local area networks or LANs, wide area networks or WANs, wireless networks, telephone networks, the Internet and/or other networks. The communications network 112 may include one or more wireless portals (not shown). The client systems 110, 114, 116, 118, and 120 are any system that an end user may use to access the server system 104. For example, the client systems 110, 114, 116, 118, and 120 may be personal computers, workstations, laptop computers, game consoles, handheld network enabled audio/video players and/or any other network appliance such as smart/electronic display eyeglasses, or holographic devices.

The client system 120 accesses the server system 104 via the combination of the communications network 112 and another system, which in this example is the client system 118. The client system 120 is an example of a handheld wireless device 122, such as a mobile phone or a handheld network enabled audio/music player or the like, which may also be used for accessing network content.

The space integration sequencer system 300 is described in more detail in FIGS. 3-7.

Figure 2A:
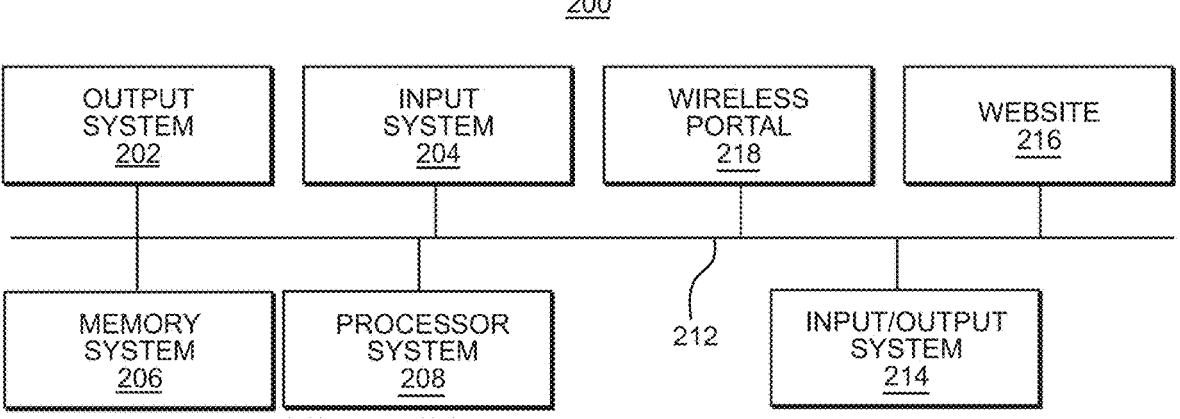
FIG. 2A shows a block diagram of a client system of a system for using a space integration sequencer system.

FIG. 2A shows a block diagram of a client system 200 of a system for using a space integration sequencer system 100.

The client system 200 may include an output system 202, an input system 204, a memory system 206, a processor system 208, a communications system 212, an input/output system 214, a website 216, and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122 that may be used as one of the network devices of FIG. 1. In other embodiments, the client system 200 may include additional components and/or may not include all of the components listed above. The output system 202 may include any one of, some of, any combination of or all of a monitor system, a wireless transmitter, a handheld display system, a printer system, a speaker system, a connection or an interface system to a sound system, an interface system to peripheral devices and/or a connection and/or an interface system to a computer system, an intranet, and/or the Internet, for example.

Figure 2B:
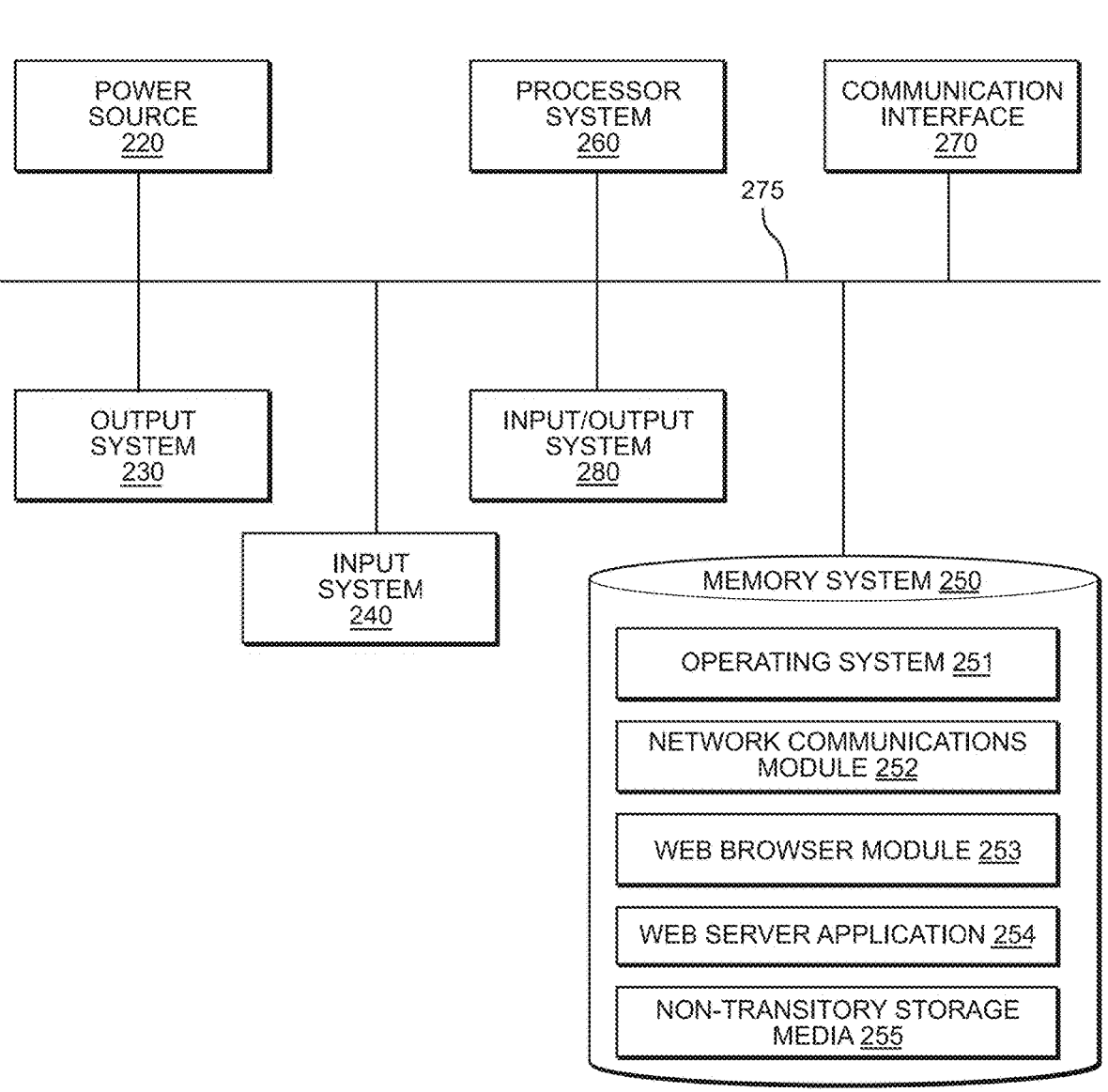
FIG. 2B illustrates a block diagram of a server system of a system for using a space integration sequencer system.

The input system 204 may include any one of some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., IrDA, USB), for example. The memory system 206 may include, for example, any one of, some of, any combination of or all of a long-term storage system, such as a hard drive, a short-term storage system, such as a random-access memory; a removable storage system, such as a floppy drive or a removable drive, and/or a flash memory. The memory system 206 may include one or more machine-readable mediums that may store a variety of different types of information. The term machine-readable medium is used to refer to any medium that is structurally configured for carrying information in a format that is readable by a machine. One example of a machine-readable medium is a computer-readable medium. The memory system 206 also stores a non-transitory storage media for using a space integration sequencer system (FIG. 2B, 255).

The processor system 208 may include any one of, some of, any combination of, or all of multiple parallel processors, a single processor, a system of processors having one or more central processors and/or one or more specialized processors dedicated to specific tasks. The processor system 208 implements the programs stored in the memory system 206. The communications system 212 communicatively buttons the output system 202, the input system 204, the memory system 206, the processor system 208, and/or the input/output system 214 to each other. The communications system 212 may include any one of, some of, any combination of, or all of one or more electrical cables, fiber optic cables, and/or means for sending signals through air or water (i.e., wireless communications), or the like. Some examples of means for sending signals through air and/or water include systems for transmitting electromagnetic waves such as infrared and/or radio waves and/or systems for sending sound waves.

The input/output system 214 may include devices that have the dual function as input and output devices. For example, the input/output system 214 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 214 is optional and may be used in addition to or in place of the output system 202 and/or the input system 204.

The client systems 110, 114, 116, 118, 120 and the handheld wireless device 122 may also be tied into a website 216 or a wireless portal 218 which is also tied directly into the communications system 212. Any website 216 or wireless portal 218 would also include software and a website module (not shown) to maintain, allow access to and run the website as well.

FIG. 2B illustrates a block diagram of a server system 104 of a system for using a space integration sequencer system 100.

The server system 104 may include a power source 220, an output system 230, an input system 240, a memory system 250, which may store an operating system 251, a communications module 252, a web browser module 253, a web server application 254, and a non-transitory storage media for using a space integration sequencer system 255. The server system 104 may also include a processor system 260, a communications interface 270, a communications system 275 and an input/output system 280. In other embodiments, the server system 104 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB), for example.

The memory system 250 may include, for example, any one of, some of, any combination of, or all of a long-term storage system, such as a hard drive; a short-term storage system, such as random-access memory; a removable storage system, such as a floppy drive or a removable drive and/or a flash memory. The memory system 250 may include one or more machine-readable mediums that may store a variety of different types of information. The term machine-readable medium is used to refer to any medium capable of carrying information that is readable by a machine. One example of a machine-readable medium is a computer-readable medium. The memory system 250 may store one or more machine instructions for reading, searching and enhancing a system for using a space integration sequencer system 300. The operating system 251 controls all software or non-transitory storage media and hardware of the overall system 100. The communications module 252 may enable the server system 104 to communicate on the communications network 112. The web browser module 253 allows for browsing the Internet. The web server application 254 serves a plurality of web pages to client systems that request the webpages, thereby facilitating browsing on the Internet. The non-transitory storage media 255 may be a non-transitory storage media space integration sequencer system that may control the overall system 100 and includes an Artificial Intelligence and Machine Learning, or AI ML, module.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communications interface 270 allows the server system 104 to interface with the communication network 112. In this embodiment, the output system 230 sends communications to the communications interface 270. The communications system 275 communicatively buttons the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications), or the like. Some examples of sending signals through air and/or water include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 280 is optional and may be used in addition to or in place of the output system 230 and/or the input device 240.

Figure 3:
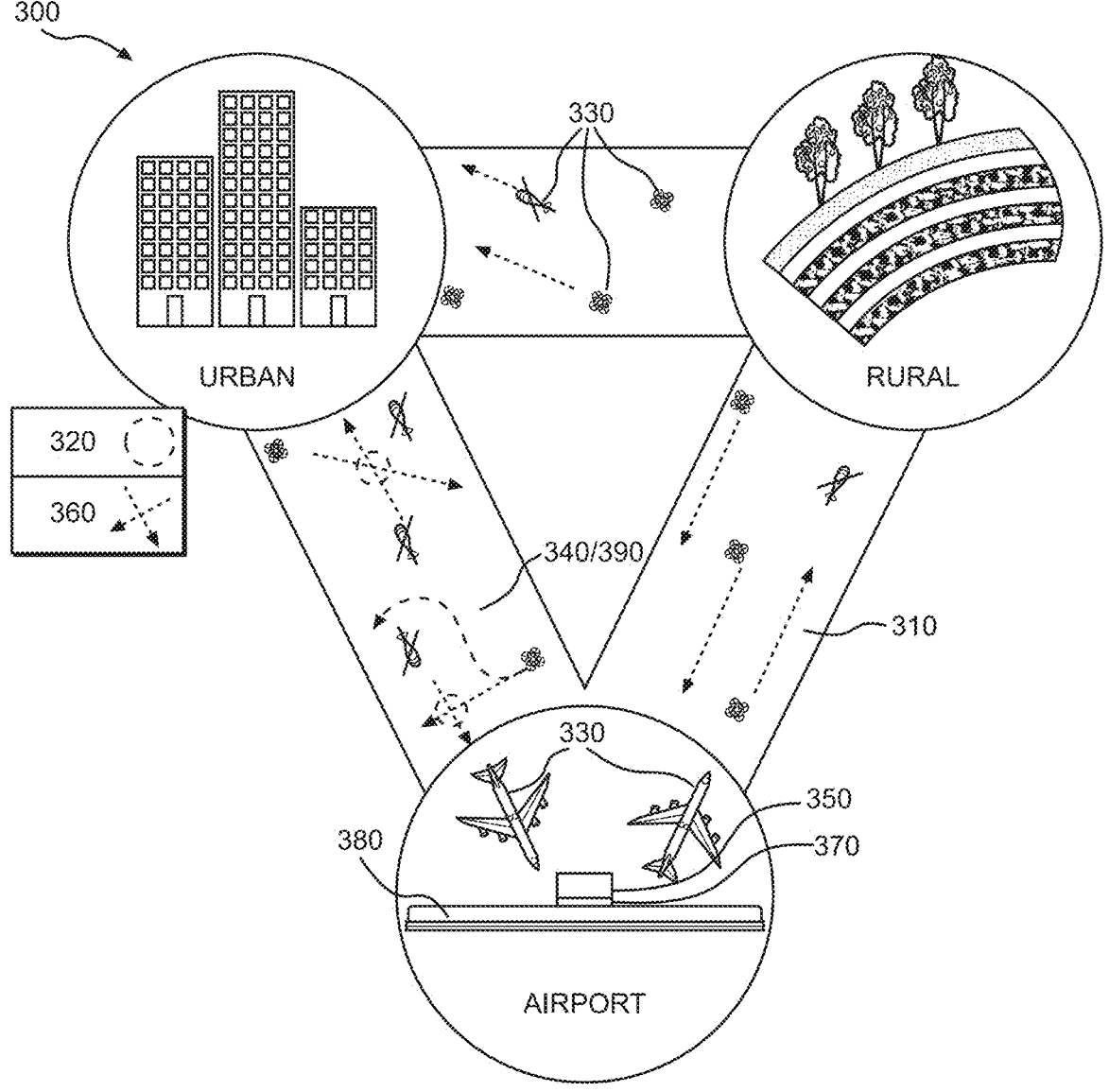
FIG. 3 shows one embodiment of a system overview of a system for using a space integration sequencer system.

FIG. 3 shows one embodiment of a system overview of a system for using a space integration sequencer system 300.

The space integration sequencer system 300 may include a plurality of pathways 310, a plurality of intersections 320, a plurality of vehicles 330, a plurality of deconfliction 340, a plurality of time elements 350, a plurality of apparent intersecting conflicts 360, and a plurality of pathway analysis information 370, and a pathway controlling system 380.

The pathways 310 may be defined as the area a vehicle must travel through over time as the vehicle makes its journey, which depending on the vehicle and the operational environment, may include two or more dimensions.

The intersections 320 may include a time element representing at least the duration for which the aircraft may safely use the runway, and a physical space element representing the area that the aircraft physically occupies, including the associated areas required for safety or regulatory purposes.

The vehicles 330 may be defined as an object (such as a vehicle or airplane or the like) moving along a pathway.

The deconfliction 340 may be defined as the process that prevents one or more vehicles from intersecting at the same moment in time.

The time elements 350 may be two or more dimensions, representing a single point in time, or a duration of time, alternatively referred to as a window or period of time.

The apparent intersecting conflicts 360 may be defined as the overlap of pathways in such a manner that the vehicles, or their included safety areas, will overlap at a moment in time.

The pathway analysis information 370 may include intersections that will be determined through the analysis of pathway information that may be sourced directly from the vehicles, indirectly from a controlling system, interpreted from the context of their prior movements, or estimated from a projection of their current vector.

The pathway controlling system 380 may include when two or more vehicles have an apparent intersecting conflict. The vehicles involved will be prioritized to determine the order in which vehicles will be given maneuvering instructions, while higher priority vehicles may maintain their original pathway while equal or lesser vehicles may be given alternative pathway instructions.

The alternative pathway instructions 390 may be given in a format sufficient for the navigation of the target vehicle that may include a route or sequence of maneuvering instructions and be in two or more dimensions, that may include instructions for speed, including minimum and maximum speed, by route segment or maneuvering sequence, that will factor in the performance capabilities of the vehicle so as to not prescribe instructions that cannot be achieved, that may include instructions for interfacing with supporting systems, including but not limited to, air traffic management systems, revenue control systems and parking management systems, that may be optimized for the minimum amount of effort needed to de-conflict the vehicles involved, both individually or in total, depending on optimization parameters and that may factor in environmental restrictions such as the pathways of surrounding vehicles and obstructions.

Figure 4A:
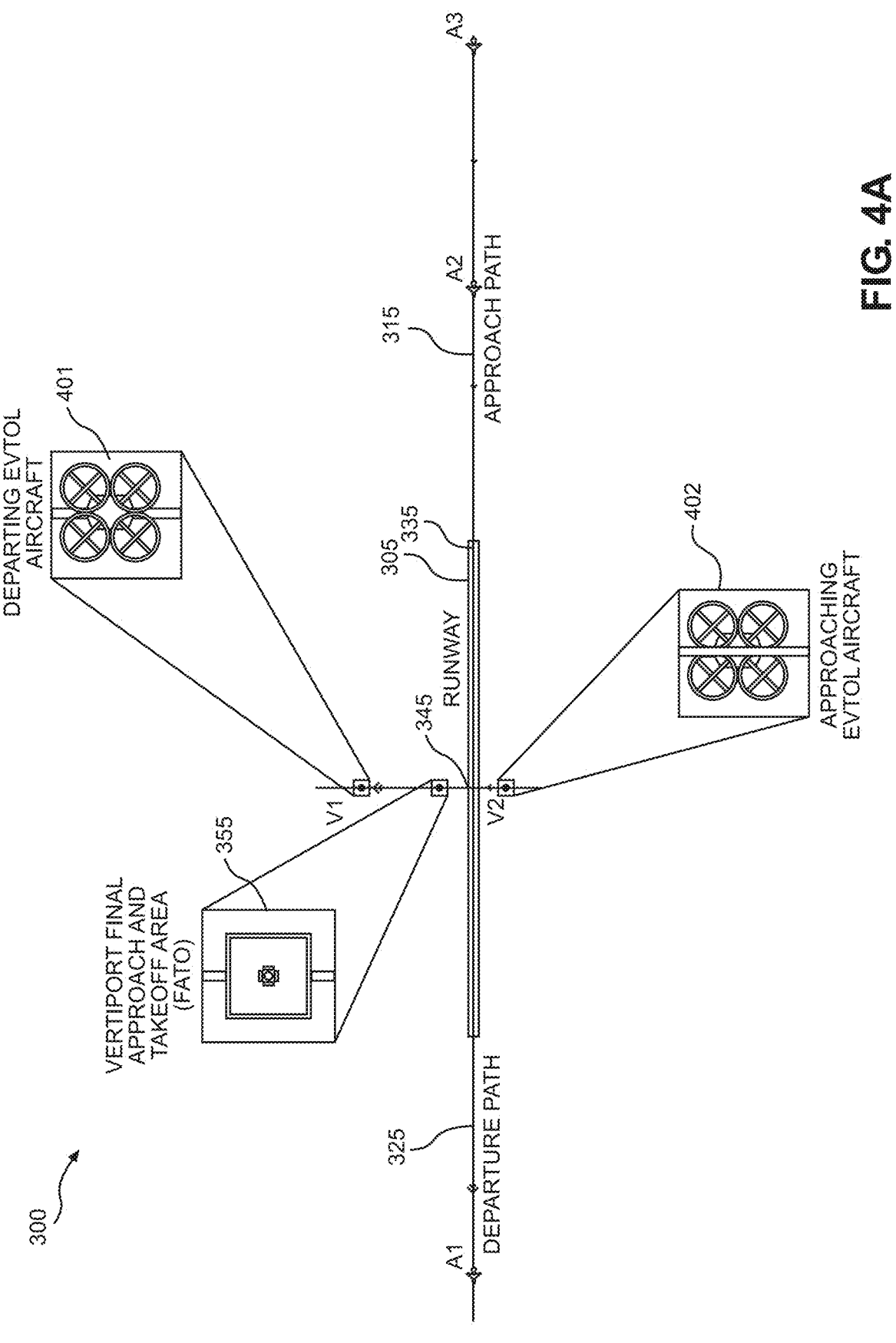
FIG. 4A shows one embodiment of an overhead view of a system for using a space integration sequencer system at a first point in time.
Figure 4B:
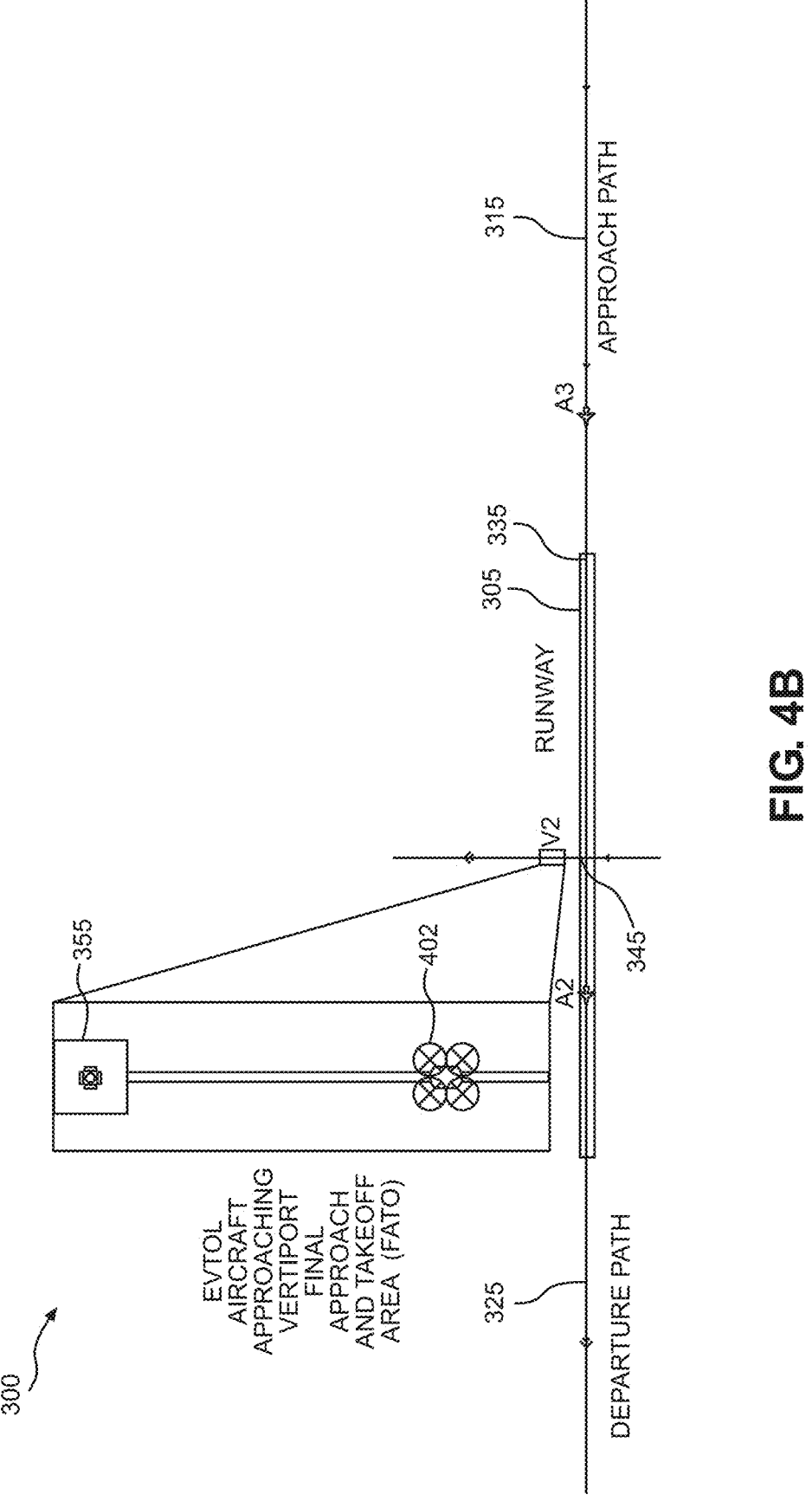
FIG. 4B shows one embodiment of an overhead view of a system for using a space integration sequencer system at a second point in time.

FIG. 4A and FIG. 4B show one embodiment of an overhead view of a system for using a space integration sequencer system 300 at a first point in time (FIG. 4A) and a second point in time (FIG. 4B).

The space integration sequencer system 300 may include a take-off and landing area or facility 305, an approach path 315 and a departure path 325, a take-off and landing surface 335 such as a runway, a touchdown area, and a liftoff area 345 such as an airport, heliport, vertiport, spaceport, and the like.

The space integration sequencer system 300 may include a plurality of acceptable approach and/or departing windows of time (also known as slots) or an area for any actual or potential vehicle or aircraft such as a Final Approach Takeoff Area (FATO) 355 as exemplified in FIG. 4A, a departing area for existing aircraft location for Electric Vertical Take-off or Landing (EVTOL) aircraft 401 as exemplified in FIG. 4A, and/or an approaching area or incoming aircraft location such as an approaching EVTOL aircraft 402 as exemplified in FIG. 4A, wherein any of FATO 355, departing EVTOL aircraft 401, or approaching EVTOL aircraft 402 may be departing or landing in any combination of one or more of slots, areas, and/or aircraft to utilize as such.

The airspace integration sequencer system 300 may calculate the performance required for UAM aircraft and the like to hit their approach window, including route and speed, and minimum power autonomy requirements prior to landing and communicates the above calculations to aircraft and air traffic controllers.

This technology will be suitable for both manned and unmanned vehicles operating separately or simultaneously. It will be compatible with Artificial Intelligence (AI) Air Traffic Control Systems, whereby the AI tools will support air traffic controllers and evolve to be capable of replacing human controllers. This will allow the system to continuously analyze data and improve over time.

FIG. 5 shows one embodiment of an overall system input 400, an overall system logic 500, and an overall system output 550 of the system for using a space integration sequencer system 300.

The overall system input 400 may include a plurality of vehicle telemetry 410 and a plurality of regulatory data 420.

The vehicle telemetry 410 may include a plurality of vehicle performance and capabilities 412, a current heading speed 414, and a pathway 416.

The regulatory data 420 may include a plurality of separation requirements 422, a plurality of obstacles and Geofences 424, a plurality of vehicle priorities 426, and an organized collection of data on a computer system or Database (DB) of a plurality of pathways and procedures 428.

The system logic 500 may identify a vehicle within proximity, determine a pathway if not provided, apply a safety area to the pathway (based on time or distance), determine if a plurality of pathways conflict, and reroute lower priority vehicles and/or vehicles with minimum impact according to a plurality of parameters, and continually (at some appropriate interval) monitor vehicles within proximity for a plurality of pathway changes.

The system logic 500 may include a pathway identifier 510, a first pathway intersection 520, an algorithm 530, a second pathway intersection 540, an overall system output 550, a pathway generator 560, and a plurality of pathway reroutes 570.

The pathway identifier 510 may take vehicle telemetry and perform classification using a Machine Learning, or ML, model or Point-in-Polygon analysis to determine if vehicle follows established procedure. The pathway identifier 510 may create pathway using Artificial Intelligence or AI or a default based on heading and speed.

The first pathway intersection 520 may apply a plurality of separation requirements to pathways to determine point of intersection, calculate time to intersection, and conflict is determined if intersection is within limit.

The algorithm 530 may use system logic for identifying vehicle pathways 510 and pathway intersections 520, 540.

The second pathway intersection 540 may include pointwise comparison of projected pathway telemetry and conflict is determined if comparison results in any instances below limit.

The overall system output 550 may include a pathway generator 560 and a pathway reroute 570 may include an AI system-wide self-monitoring function that reports accuracy and completeness of input and output data to ensure the integrity of directions provided to users.

The pathway generator 560 may determine origin and destination vectors, perform a safety assessment to avoid vehicles, obstacles, or prohibited areas, and calculate a minimum performance change pathway to connect origin and destination vectors.

The pathway reroute 570 may create alternate pathways for each conflicting vehicle, compare level of effort for each vehicle to deconflict, and based on priorities, choose to reroute with lowest impact to level of effort.

Figure 6:
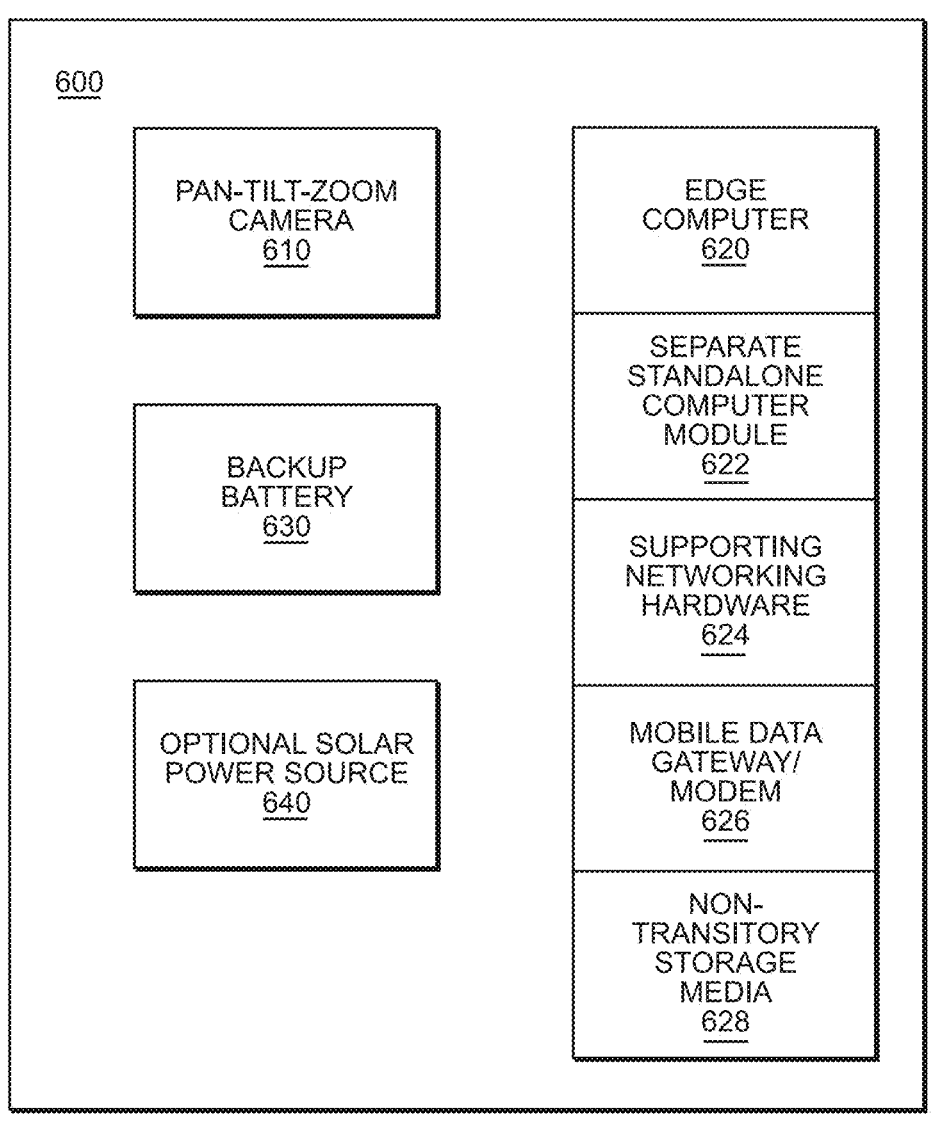
FIG. 6 shows one embodiment of a camera-based sensor system of the system for using a space integration sequencer system.

FIG. 6 shows one embodiment of a camera-based sensor system 600 of the system for using a space integration sequencer system 100.

The camera-based sensor system 600 may include a Pan-Tilt-Zoom camera 610, an edge computer 620, a backup battery 630, and an optional solar power source 640.

The Pan-Tilt-Zoom camera 610 may be readily available in the market today to avoid needing to create a custom camera. The Pan-Tilt-Zoom camera 610 may be a thermal camera (not shown) or the like to allow for performance in low visibility conditions.

The edge computer 620 may be facilitated either by hardware onboard the Pan-Tilt-Zoom camera 610 or on a separate standalone computer module 622, depending on the Pan-Tilt-Zoom camera 610 and any computing requirements determined. A plurality of supporting networking hardware 624 may depend on implementation and may include a mobile data gateway/modem 626 for connectivity where network infrastructure is unavailable.

The backup battery 630 would have to be sized according to the camera-based sensor system's 600 power draw.

The optional solar power source 640 would have to be sized according to the camera-based sensor system's 600 power draw.

The edge computer 620 may include a non-transitory storage media 628 for a plurality of computer vision algorithms, a plurality of Pan-Tilt-Zoom camera 610 controls, and a plurality of communication functions. The edge computer 620 may be configurable, including a Pan-Tilt-Zoom camera 610 orientation relative to the runway and any functions for baseline learning of the deployment environment. The primary function of the Pan-Tilt-Zoom camera 610 is to detect aircraft, either on approach or queuing for departure, and then follow the movement of that aircraft within the camera's field of view, zooming-in on the aircraft and changing the Pan-Tilt-Zoom camera 610 angle as the aircraft moves. As the Pan-Tilt-Zoom camera 610 zooms in, the aircraft gets closer, and the angle of the aircraft becomes perpendicular to the Pan-Tilt-Zoom camera 610, the server system 104 will further use object detection to identify tail numbers and registration numbers and then captures images of those elements for further analysis. Depending on the computing power on the edge computer 620 and the effect on the latency of Pan-Tilt-Zoom camera 610 controls, those captured images will be processed for operating airline and Optical Character Recognition or OCR.

Figure 7:
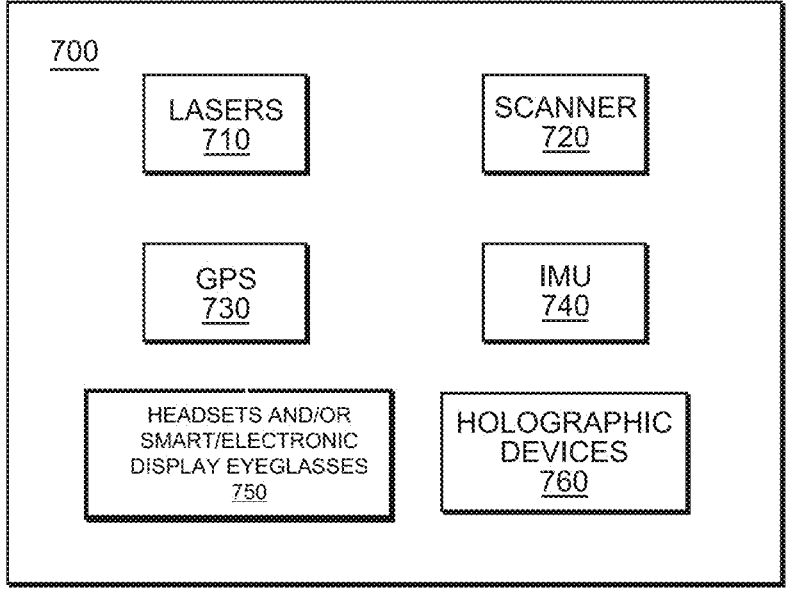
FIG. 7 shows one embodiment of a Light Detection and Ranging (LiDAR) system of the system for using a space integration sequencer system.

FIG. 7 shows one embodiment of a Light Detection and Ranging (LiDAR) system 700 of the system for using a space integration sequencer system 100.

The Light Detection and Ranging system 700 may include a plurality of lasers 710, a scanner 720, a Global Positioning System or GPS 730, an Inertial Measurement Unit or IMU 740, at least one of a headset and/or at least one of a pair of smart/electronic display eyeglasses 750, and/or at least one of a holographic device 760 wherein the headsets, smart/electronic display eyeglasses, and holographic devices provide various forms of information such as audible, visible, and sensory through reality and/or augmented reality.

The lasers 710 may emit laser pulses towards an aircraft or the like. The scanner 720 may direct the lasers 710 across a target area. The GPS 730 may provide accurate location data across the target area. The IMU 740 may include measuring an orientation and movement of the LiDAR system 700 to ensure precise data capture. The headsets and/or smart/electronic display eyeglasses 750 may be AI devices or the like. The holographic devices 760 may be AI devices or the like.

The LiDAR system 700 may be an airborne LiDAR system, a terrestrial LiDAR system, or the like.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A system, comprising:

a server system with a processor system, a communications interface, a communications system, an input system and an output system, the server system having access to a communications network;

a memory system with an operating system, a communications module, a web browser module, a web server application and a space integration sequencer system non-transitory storage media, the memory system is in communication with the server system through the communications network;

a space integration sequencer system communicating with the server system via the communications network;

a camera-based sensor system incorporated into the space integration sequencer system;

wherein the space integration sequencer system includes an overall system input, an overall system logic, and an overall system output wherein the overall system input includes a plurality of vehicle telemetry and a plurality of regulatory data and further wherein the vehicle telemetry includes a plurality of vehicle performance capabilities, a plurality of current heading speeds, and a plurality of pathways;

wherein the vehicle telemetry is for a current aircraft and a legacy aircraft wherein the vehicle telemetry is for emerging Advanced Air Mobility (AAM) aircraft and Urban Air Mobility (UAM) aircraft;

wherein the regulatory data includes a plurality of separation requirements, a plurality of obstacles and Geofences, a plurality of vehicle priorities, and an organized collection of data that includes a database of a plurality of pathways and procedures;

wherein the overall system logic includes a pathway identifier, a first pathway intersection, an algorithm, and a second pathway intersection wherein the pathway identifier takes the vehicle telemetry and performs classification using a Machine Learning model analysis to determine if the vehicle follows established procedure;

wherein the pathway identifier takes the vehicle telemetry and performs classification using a Point-in-Polygon model analysis to determine if the vehicle follows established procedure;

wherein the pathway identifier is created using Artificial Intelligence;

wherein the pathway identifier is a default based on heading and speed;

wherein the first pathway intersection applies separation requirements to pathways to determine point of intersection, calculate time to intersection, and conflict is determined if intersection is within limit; and wherein the second pathway intersection includes pointwise comparison of projected pathway telemetry and conflict is determined if comparison results in any instances below limit.

2. The system according to claim 1, further comprising a client system that accesses the server system via the communications network wherein the client system is selected from a group consisting of a smart phone, a smart watch, a laptop computer, or a desktop computer.

3. The system according to claim 1, wherein the space integration sequencer system non-transitory storage media utilizes Artificial Intelligence and Machine Learning.

4. The system according to claim 1, wherein the overall system output includes a pathway generator and a pathway reroute wherein the pathway generator determines origin and destination vectors, performs safety assessment to avoid vehicles, obstacles, or prohibited areas, and calculates minimum performance change pathway to connect origin and destination vectors.

5. The system according to claim 4, wherein the pathway reroute creates alternate pathways for each conflicting vehicle, compares level of effort for each to deconflict, and based on priorities, chooses to reroute with lowest impact to level of effort.

6. The system according to claim 1, wherein the camera-based sensor system includes a Pan-Tilt-Zoom camera, an edge computer, a backup battery, and an optional solar power source.

7. The system according to claim 1, further comprising a Light Detection and Ranging system includes a plurality of lasers, a scanner, a Global Positioning System, an Inertial Measurement Unit, at least one of a headset and/or at least one of a pair of smart/electronic display eyeglasses, and/or at least one of a holographic device.

8. The system according to claim 7, wherein the Light Detection and Ranging system is an airborne Light Detection and Ranging system.

9. The system according to claim 7, wherein the Light Detection and Ranging system is a terrestrial Light Detection and Ranging system.

10. The system according to claim 7, wherein the at least one headset and/or the at least one pair of smart/electronic display eyeglasses are Artificial Intelligence devices capable of providing various forms of information such as audible, visible, and sensory through reality and/or augmented reality.

11. The system according to claim 7, wherein the at least one holographic device is an Artificial Intelligence device.

* * * * *